United States Patent Office 3,414,420
Patented Dec. 3, 1968

3,414,420
OIL WELL CEMENT AND METHOD OF MAKING THE SAME
Sam Maravilla, Lansing, Ill., and Joseph E. Kopanda, Crown Point, Ind., assignors to United States Steel Corporation, a corporation of Delaware
No Drawing. Filed Jan. 28, 1965, Ser. No. 428,851
2 Claims. (Cl. 106—92)

ABSTRACT OF THE DISCLOSURE

A retarded oil well cement including an oil well portland cement, and a retarder present in an amount equal to 0.08 to 0.13% by weight of the cement. The retarder consists of 1 to 8 parts by weight of a modified starch to 1 part of dextrine. The starch has a cold water solubility range of 20 to 30% and the dextrine a cold water solubility range of 12 to 35%. The cement is made by grinding the modified starch at a maximum temperature of 100° F. to such fineness that it will pass a 200 mesh sieve, and then mixing the three ingredients at a maximum temperature of 140° F.

---

This invention relates to an oil well cement and to a method of making the same, and more particularly relates to retarded oil well cements for use at the relatively high temperatures and pressures present in the depth range of 6,000 to 14,000 ft. One cement of this type is shown in Andes et al. Patent No. 2,429,211, dated Oct. 21, 1947. However, the cement of this patent has not performed in accordance with all current American Petroleum Institute specifications and field practices. In order that a modifier of oil well cement slurries will function properly, it is extremely important for the modifier to positively control the thickening-time within a prescribed condition, and to control the viscosity of the slurry to a value consistent with normal oil field pumping practices during the greater part of this thickening-time. Also, the rate of set and concurrent strength development of this cement must occur within prescribed time limits so that drilling operations may be continued. All these functions must take place smoothly within a definite range limit of temperature (80 to 290° F.) under pressure (atmospheric to 14,000 p.s.i.) and in combination with other chemically active additives.

Prior to our invention and as described in the Andes patent, the modifier was mixed and ground with the cement clinker to produce the desired cement.

Powdered dextrine, which is a starch produced by dry roasting raw starch at approximately 250 to 350° F. in the presence of an atomized catalytic agent such as HCl or HNO₃ has also been used with the modified starch of Andes in order to make the oil well cement more compatible with field additives, such as bentonite. The cement clinker, gypsum, modified starch and dextrine were interground in ball mills to produce the oil well cement. The ideal properties for retarded oil well cement are considered to be substantially indicated by equal and consistent thickening-times in the temperature range of 140 to 200° F. However, the cement produced according to this method was not always uniform in producing equal and consistent thickening-time results in this temperature range. The behavior of the cement often underwent objectionable changes after its manufacture and during storage. Thus, even though the cement as tested shortly after its manufacture by an established procedure was satisfactory, there was no assurance that the cement, when it reached the customer, would have this same performance.

We have found that the intergrinding in the ball mills tends to degrade the starch and dextrine so as to develop erratic retarding functions. Because the retarding action was not uniform, it was difficult to determine the amount of retarder necessary before grinding the clinker and retarder into cement. Also, the hot cement when stored in silos continued to degrade the starch and dextrine. There was also an unpredictable but progressive shortening of thickening-time with freshly ground cement during the first 72 hours of storage.

It is therefore an object of our invention to produce a cement which is relatively free of the above objectionable features.

Another object is to provide such a cement which requires the addition of less retarder than in the previous cement.

Still another object is to provide a method of making such a cement.

These and other objects will be made apparent after referring to the following specification.

According to our invention, we provide an oil well cement clinker and a small amount of gypsum which are ground together in a ball mill usually below 220° F. and then passed through cement coolers until the cement temperature is below 165° F., and preferably below 140° F. The resulting product is hereinafter refered to as "oil well basic cement." This, like the cement of the Andes patent, is a hydraulic portland cement and may contain other additives which are normally used. In a specific embodiment of our invention, the cement is an ASTM Type II moderate sulfate-resistant cement as defined in the "American Petroleum Institute Specification for Oil-Well Cements and Cement Additives" (API Std 10A), of March 1964. A modified starch as described in the Andes patent is ground to such fineness that it will pass a 200-mesh sieve while limiting it to a maximum temperature of 100° F. The term "modified starch" as used hereinafter in the specification and claims is limited to modified starch as described in the Andes patent. As therein described, the modified starch is of the group consisting of oxidized starches and hydrolyzed starches which are substantially nongelling when added to water and cement-water mixtures and which form a solution in water that responds to the iodine test for starch to show a blue to violet color. The modified starch, together with dextrine as defined above, are combined in a ratio of between 1 and 8 parts by weight of starch to 1 part by weight of dextrine to form a retarder which is used in cement in an amount not exceeding 0.13% by weight and at least .08%. The components of the retarder may be mixed together and then added to the basic cement or the individual retarders and the cement may be blended at one time. In any event, a maximum temperature of 140° F. is maintained during the blending period. It is preferred that the temperature be considerably lower.

In the preferred practice of our invention, the basic cement is placed in a storage bin or silo and at least three samples thereof are obtained. A different percentage of total retarder is added to each sample and each of the samples is tested in a Pan American Thickening-Time Tester at a given API schedule as found in "API Recommended Practice for Testing Oil-Well Cements and Cement Additives" (API RP 10B) of March 1964. The three resulting thickening-times are plotted on a graph to establish the characteristics of this particular basic cement as to its performance with this retarder. The desired thickening-time with its corresponding amount of total retarder is determined from this graph. Using these results, a precise amount of retarder is added to the basic cement. Under the conditions set forth above, we have found that the resulting retarded oil well cement as shipped will have a thickening-time very close to the laboratory results.

The modified starch should have a cold water solubility range of 20 to 30% and it is preferred to use starch with a cold water solubility of 22%. The dextrine should have a cold water solubility of 12 to 35%, although it is preferred to use a dextrine having a cold water solubility of 20±2%. In order to determine the thickening-time of the cement, the amount of total retarder is varied while holding the retarder ratio constant. The time required to predict accurately the thickening-time slurry properties of the blended cement product produced according to our method is less than 24 hr. as compared to 72 hr. or longer for the old method. Uniformity of thickening-time for various well conditions can be controlled by modifying the ratio between the modified starch and dextrine and by varying the total retarder.

The percentage of total retarder and ratio of starch to dextrine may be varied within the limits set forth above, in order to change the characteristics of the cement. For example, when using an ASTM Type II basic cement and adding 0.08% total retarder, the API Schedule 6 thickening-time can be varied from 3 hours and 5 minutes when the ratio of starch to dextrine is 2:1 to 2 hours and 48 minutes when the ratio of starch to dextrine is 3.25:1. With the same cement, the thickening-time can be changed to 4 hours and 45 minutes by adding 0.10% of retarder in which the ratio of starch to dextrine is 3.25:1.

While several embodiments of our invention have been described it will be apparent that other modifications and adaptations can be made without departing from the scope of the following claims.

We claim:

1. A retarded oil well cement of consistent retarding behavior comprising an oil well portland cement, and a retarder present in an amount equal to 0.08 to 0.13% by weight of said portland cement, said retarder consisting of 1 to 8 parts by weight of a modified starch to 1 part by weight of dextrine, said starch being of the group consisting of oxidized starches and hydrolyzed starches which are substantially non-gelling when added to water and cement-water mixtures and which form a solution in water that responds to the iodine test for starch to show a blue to violet color, said starch having a cold water solubility range of 20 to 30% and the dextrine a cold water solubility range of 12 to 35%.

2. The method of making a retarded oil well cement which includes an oil well portland cement and a retarder present in an amount equal to 0.08 to 0.13% by weight of said portland cement, said retarder consisting of 1 to 8 parts by weight of a modified starch to 1 part by weight of dextrine, said starch being of the group consisting of oxidized starches and hydrolyzed starches which are substantially non-gelling when added to water and cement-water mixtures and which form a solution in water that responds to the iodine test for starch to show a blue to violet color, said starch having a cold water solubility range of 20 to 30% and the dextrine a cold water solubility range of 12 to 35%; which method comprises providing an oil well portland cement, grinding said modified starch at a maximum temperature of 100° F. to such fineness that it will pass a 200 mesh sieve, providing powdered dextrine, and then mixing said starch, dextrine and oil well portland cement at a maximum temperature of 140° F.

References Cited

UNITED STATES PATENTS

| | | | |
|---|---|---|---|
| 2,374,628 | 4/1945 | Swayze | 106—92 |
| 2,429,211 | 10/1947 | Andes | 106—92 |
| 2,576,955 | 12/1951 | Ludwig | 106—92 |
| 2,648,645 | 8/1953 | Boris et al. | 106—92 |

TOBIAS E. LEVOW, *Primary Examiner.*

SAMUEL E. MOTT, *Assistant Examiner.*